3,528,822
COLORING PROCESS CHEESE

Benjamin Borenstein, Teaneck, N.J., assignor to Hoffmann-La Roche Inc., Nutley, N.J., a corporation of New Jersey
No Drawing. Filed Feb. 1, 1968, Ser. No. 702,169
Int. Cl. A23c *19/12;* A23l *1/27*
U.S. Cl. 99—117                                               6 Claims

ABSTRACT OF THE DISCLOSURE

A composition containing canthaxanthin is disclosed and the use of such composition in coloring process cheese is described.

BACKGROUND OF THE INVENTION

Canthaxanthin, i.e., 4,4'-diketo-$\beta$-carotene, is a known compound which possesses high tinctorial potency. It is a useful food colorant in the red range at concentrations of from 5 to 60 p.p.m.

A water-dispersible market form of canthaxathin has been developed for use as a colorant for aqueous and emulsion foods. In coloring such foods, the water-dispersible canthaxathin product is dispersed in water and the dispersion is added to, and distributed throughout, the food. However, a procedure of this nature leaves much to be desired insofar as the coloring of process cheese is concerned. It has been determined that process cheese, treated with an aqueous dispersion of a water-dispersible canthaxanthin product, suffers a loss of its canthaxanthin content, in the range of 50% to 100%, over the period of about two weeks when the cheese is kept at normal refrigeration temperatures.

BRIEF SUMMARY OF THE INVENTION

The present invention is concerned with a composition containing canthaxanthin and with the use of such composition in coloring process cheese.

The invention is predicated on the finding that crystalline canthaxanthin, a known compound which is insoluble or substantially insoluble in most nontoxic edible solvents, is soluble in diacetylated monoglycerides. The compositions of the invention are prepared by adding crystalline canthaxanthin to a diacetylated monoglyceride and dissolving same therein.

The compositions of this invention are solutions of canthaxanthin in a diacetylated monoglyceride. When added to process cheese, such solutions impart an attrative color to the cheese which withstands fading when the cheese is maintained at normal refrigerator temperatures, even for extended periods of time.

DETAILED DESCRIPTION

In its broadest embodiment, the invention provides novel canthaxanthin-containing compositions.

In its more particular embodiments, the invention provides a coloring composition comprising a solution of canthaxanthin in a diacetylated monoglyceride.

In another embodiment, the invention provides a practical and commercially feasible method for coloring process cheese.

In the practice of the invention, crystalline canthaxanthin is employed. In producing the colorant compositions canthaxanthin is added to, and dissolved in, a nontoxic, edible diacetylated monoglyceride. In the present specification and claims, the expression diacetylated monoglyceride is used to denote glyceryl esters in which the hydroxyl group at the 1-position of the glycerol molecular is esterified with a fatty acid, saturated or unsaturated, having from 12 to 18 carbon atoms, for example, lauric acid, myristic acid, palmitic acid, stearic acid, oleic acid, ricinoleic acid, etc. and in which the hydroxyl groups at the 2- and 3-positions of the glycerol molecule are acetylated. Products of this nature, i.e., derived fats in which acetic acid is one of the acids present, are commercially available, the source fat being, for example, lard, hydrogenated lard, cottonseed oil, hydrogenated cottonseed oil, etc. Representative thereof, are the distilled diacetylated monoglycerides which are marketed under the trademark of Myvacet. Particularly well suited for use in Myvacet Type 9–40, an almost colorless liquid corresponding to a distilled monoglyceride which is essentially completely acetylated. It has an Iodine Value of about 42; a Saponification Value of about 380; a Reichert-Meissl Value of 145; an Acid Value of less than 4; and a Peroxide Value of less than 2. Myvacet Type 9–85, the source of fat of which is cottonseed oil, is also well suited for use. The specifications for Myvacet 9–85 are, to a certain extent, the same as those for Myvacet 9–40, one readily apparent difference between the two being that Myvacet 9–85 is more unsaturated, its Iodine Value being about 70.

The manner in which the canthaxanthin is dissolved in the diacetylated monoglyceride is not particularly critical. If the diacetylated monoglyceride in use is liquid, the canthaxanthin can be added thereto, and dissolved therein, at room temperature. However, dissolution of the carotenoid will be facilitated if the solvent therefor is heated to a temperature somewhat above room temperature, for example, to a temperature of up to about 85° C. Where, however, the diacetylated monoglyceride is of solid semisolid consistency, it should be heated to a temperature above its melting prior to adding the canthaxanthin thereto.

The quantity of canthaxanthin which is present in the compositions of this invention is variable within certain limits. For example, the invention embraces compositions, i.e., solutions, which contain from about 0.05% to about 1.0% by weight of canthaxanthin dissolved in a diacetylated monoglyceride. The preferred compositions of this invention, however, are solutions which contain from about 0.1% to about 0.4% by weight of canthaxanthin.

In addition to the essential ingredients, namely, canthaxanthin and a diacetylated monoglyceride, the compositions of this invention can contain an antioxidant, or an antioxidant mixture, as an optional component. In general, any edible, non-toxic antioxidant can be used in the practice of the invention. These include, for example, propyl gallate, nordihydroquairetic acid, butylated hydroxyanisole, butylated hydroxy toluene, etc. The quantity of antioxidant which is used is variable. As a general rule, however, from about 0% to about 50% by weight, based on the weight of the canthaxanthin present, of antioxidant will be employed.

The manner in which the compositions of this invention are used as a colorant for process cheese will be readily apparent to persons skilled in the art. In general, the method involves the step of adding the composition to this invention to molten process cheese and, by suitable mixing, uniformly distributing same throughout the cheese. Generally, process cheese can be rendered molten by heating it to a temperature of about 60° C., although it will be appreciated that the practice of the present invention is not restricted to the use of such temperature. Where the colorant composition in use is solid or semisolid, it is converted to a molten state by heating prior to its addition to the molten cheese. Where, however, the colorant composition is a liquid at normal room temperature, it need not, but it may if desired, be heated to a temperature elevated somewhat above room temperature prior to its addition to the molten cheese.

The quantity of the composition of this invention which is used in the process for coloring process cheese is variable. A sufficient quantity of the colorant composition will be used to provide that amount of canthaxanthin required to impart to the process cheese the desired coloration. In general, however, the objectives of the invention will be achieved by the use of that quantity of canthaxanthin solution which will provide from about 1 mg. to about 10 mg. of canthaxanthin for each pound of process cheese. It is to be fully understood, however, that greater and lesser quantities of canthaxanthin can be incorporated into the process cheese, if desired. However, where the ratio of canthaxanthin to process cheese is less than 1 mg. per pound, the color imparted to the cheese product is not entirely satisfactory. On the other hand, the use of a ratio of canthaxanthin to process cheese which exceeds about 10 mg. per pound, is impractical since it adds to the cost of the ultimate product without enhancing its customer acceptability.

For a fuller understanding of the nature and objects of this invention, reference may be had to the following examples which are given merely as a further illustration of the invention and are not to be construed in a limiting sense.

EXAMPLE 1

In this example, 0.40 gram of canthaxanthin was added to 100 grams of diacetylated monoglyceride containing about 0.02% by weight of butylated hydroxy anisole, about 0.006% by weight of propyl gallate and about 0.004% by weight of citric acid. Myvacet 9–40 was the diacetylated monoglyceride employed. The mixture was heated to a temperature of 75° C. and it was maintained at that temperature until dissolution of the canthaxanthin in the solvent was completed.

The solution, produced as described in the preceding paragraph, was evaluated as a colorant for process cheese. In this evaluation, one and one-half pound of uncolored process cheese was broken into small pieces and melted in a double boiler. To the melted cheese, 1.25 grams of the canthaxanthin solution, produced as described in the preceding paragraph, was added. The amount of canthaxanthin solution was sufficient to provide 3.3 mg. of canthaxanthin per pound of process cheese. The cheese was poured into molds where it was allowed to cool to room temperature. The process cheese, thus obtained, had an attractive cheese color resembling the hue of cheese colored with a high annatto-content, annatto-paprika mixture.

In order to determine color stability of the process cheese treated with the canthaxanthin solution, the cheese was maintained at refrigerator temperature for a period of about nine months. After about three months at refrigerator temperature, the process cheese was assayed and it was found to have retained about 79% of its initially assayed (3.1 mg./pound) canthaxanthin potency. At the end of about nine months, at refrigerator temperature, it was found that the process cheese had retained about 75% of its initially assayed canthaxanthin potency.

EXAMPLE 2

In this example, process cheese was colored by the method described in Example 1, using the canthaxanthin solution described in that example. In this instance, however, a ratio of 1.88 grams of the canthaxanthin-containing solution was added to one and one-half pounds of process cheese to provide a product comprising 4.95 mg. of canthaxanthin per pound of process cheese.

The use of the canthaxanthin-containing product, at the level described in the preceding paragraph, imparted an attractive color to the process cheese. The cheese resembled that colored with a high annatto-content annatto-paprika. The cheese was stored at refrigerator temperature for a period of up to nine months. It was found that, at the end of three months at refrigerator temperature, the cheese had retained about 69% of its initially assayed (4.87 mg./pound) canthaxanthin content. At the end of the nine month period, the cheese had retained about 65% of its initially assayed canthaxanthin potency.

I claim:

1. A composition comprising a diacetylated monoglyceride having dissolved therein from about 0.05% to about 1.0% by weight of crystalline canthaxanthin.

2. The composition of claim 1 wherein there is present from about 0.1% to about 0.4% by weight of canthaxanthin.

3. A food composition comprising (1) process cheese, (2) canthaxanthin and (3) a diacetylated monoglyceride, there being present in said composition a ratio of from about 1 mg. to about 10 mg. of canthaxanthin for each pound of said process cheese, said canthaxanthin having been incorporated into the process cheese in the form of a solution containing from about 0.05% to about 1.0% by weight of canthaxanthin in a diacetylated monoglyceride.

4. The composition of claim 3 wherein canthaxanthin is incorporated in the form of a solution containing from about 0.1% to about 0.4% by weight of canthaxanthin in a diacetylated monoglyceride.

5. A process for coloring process cheese which comprises heating process cheese to transform same to a molten state and adding thereto a solution of crystalline canthaxanthin in a diacetylated monoglyceride, there being present in said solution from about 0.05% to about 1.0% by weight of canthaxanthin, a sufficient quantity of said canthaxanthin solution being used to provide a ratio of from about 1 mg. to 10 mg. of canthaxanthin per pound of process cheese.

6. The process of claim 5 wherein canthaxanthin is provided in the form of a solution containing from about 0.1% to about 0.4% by weight of canthaxanthin.

References Cited

UNITED STATES PATENTS

| | | | |
|---|---|---|---|
| 2,861,891 | 11/1958 | Bauernfeind | 99—148 |
| 3,206,316 | 9/1965 | Kläui | 99—117 |
| 3,316,101 | 4/1967 | Borenstein et al. | 99—148 |

JOSEPH M. GOLIAN, Primary Examiner

U.S. Cl. X.R.

99—148